Oct. 28, 1958                 D. A. BATTISTE            2,858,220
METHOD OF PREPARING AN IN-CAN BAKED RYE BREAD
AND THE RESULTANT PRODUCT
Filed Sept. 8, 1954
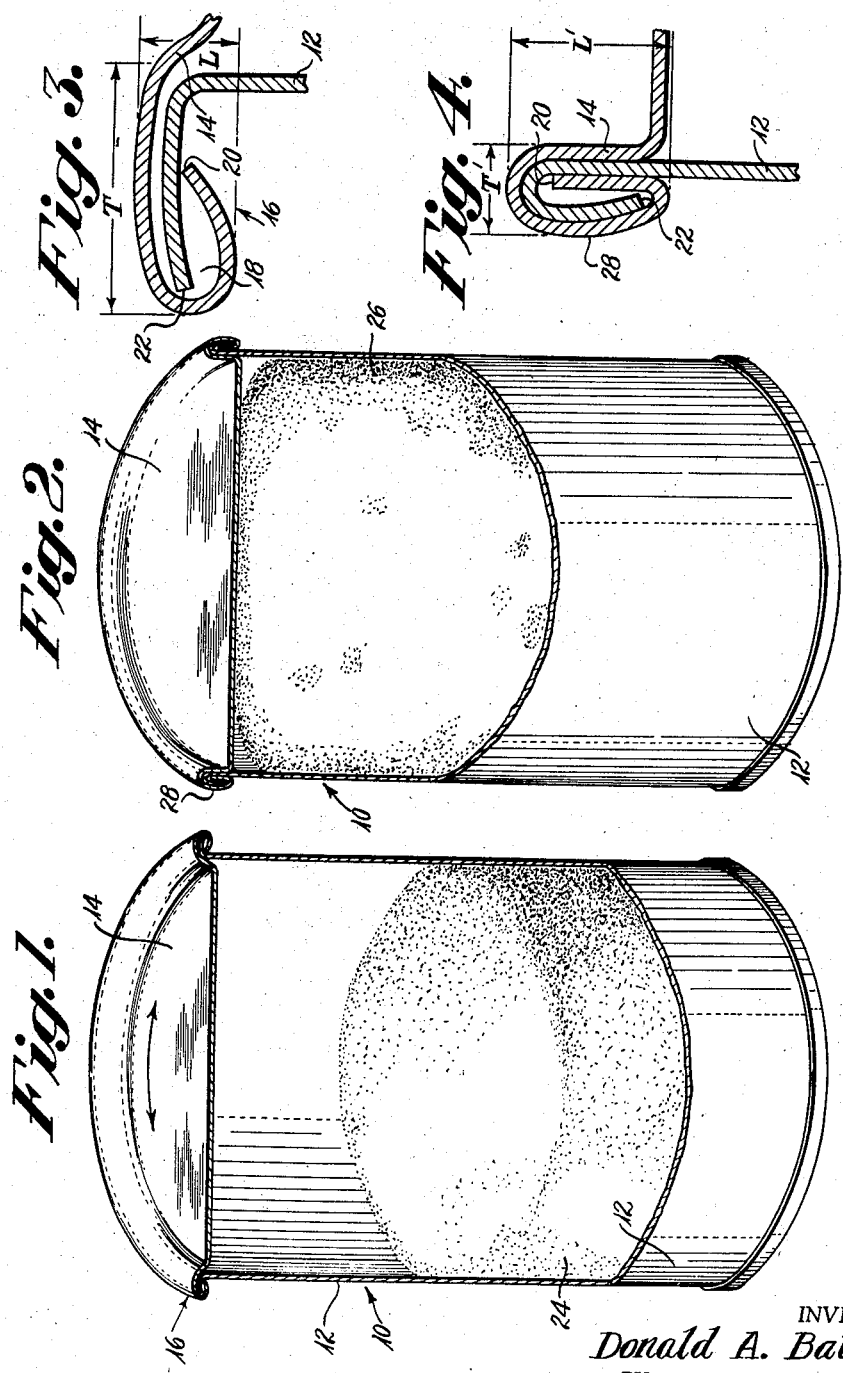
INVENTOR.
Donald A. Battiste
BY
ATTORNEY

United States Patent Office 2,858,220
Patented Oct. 28, 1958

2,858,220

METHOD OF PREPARING AN IN-CAN BAKED RYE BREAD AND THE RESULTANT PRODUCT

Donald A. Battiste, Philadelphia, Pa.

Application September 8, 1954, Serial No. 454,767

2 Claims. (Cl. 99—90)

This invention relates to in-can baked canned cake and special bakery products and more particularly to almond filled coffee cake, pumpernickel bread, rye seeded bread, 100% whole wheat bread, salt-free and sugar-free coffee cake, 100% gluten bread, 100% pumpernickel salt-free and sugar-free bread, salt-free and sugar-free 100% seeded rye bread, salt-free, sugar-free 100% whole wheat bread, and salt-free, sugar-free white bread.

Various attempts have been made to bake cake and special types of bread in a can and hermetically seal same to produce a canned baked bakery product, but each attempt has proved that it is very difficult to provide an in-can baked cake or special bakery product which will be stable and edible after a long period of time.

This application is a continuation-in-part of my co-pending application Serial No. 357,899, filed May 27, 1953, entitled "Canned Baked Products."

It is an object of this invention to provide by my novel in-can baking process bakery products which are baked in a can and which may be stored for long periods of time and subsequently consumed without any danger to the health of the user.

It has been discovered in accordance with my present invention that a stable in-can baked cake or specialty bakery product may be produced from the specific recipes, to be given hereinafter, which will provide the in-can baked cake or specialty bread to be hermetically sealed in a container which has a limited amount of moisture, of not more than 34%, and has a low pH value of 4.6 to 5.0. The control of the moisture content and pH value in in-can baked cake and specialty bakery products eliminates the dangers of C. botulinium toxin by preventing the survival of any spores which may have formed in the can. Further, by keeping the pH value constant it is possible to prevent B. mesenterious growth.

Accordingly, it is the prime object of this invention to successfully commercially acceptable in-can baked cake and specialty bakery products, such as almond filled coffee cake, pumpernickel bread, rye seeded bread, 100% whole wheat bread, salt-free and sugar-free coffee cake, 100% gluten bread, 100% pumpernickel salt-free and sugar-free bread, salt-free and sugar-free 100% seeded rye bread, salt-free and sugar-free 100% whole wheat bread, and salt-free, sugar-free white bread. In each of the above mentioned examples the result of cakes and specialty bakery products produced by following my novel in-can baking process has been a canned baked product of superior quality of a high degree of stability.

In the accompanying drawings:

Fig. 1 is an isometric view partly in section with parts thereof broken away showing the tightly clinched can having a portion of batter or piece of dough therein prior to the in-can baking step;

Fig. 2 is a view similar to Fig. 1 showing the in-can baked cake or specialty bakery product after the can has been completely sealed;

Fig. 3 is a sectional view showing the clinched double seam of the can in Fig. 1, on an enlarged scale for the purpose of illustration only, showing the obstructed opening intermediate the peripheral edge of the lid and the peripheral upper edge of the can body; and Fig. 4 is a view similar to Fig. 3 showing as an illustrative unchanged view the double seam of the sealed can of Fig. 2.

In producing the in-can baked cake and specialty bakery products of the instant invention, my process involves the preparation of special mixes, each to be specifically shown by way of example hereinafter. These specific mixes are treated individually with regard to the steps prior to the baking thereof, and I shall specifically disclose the preparation of each mix individually after I have explained certain steps in my novel process which is common for all of the products.

After each of the specific mixes are prepared they are scaled or divided into portions or pieces and loaded into cans or containers, and the lids or covers are partially sealed to the cans or containers by tightly clinching the lids or covers thereon by a clinching machine which creates an obstructed opening intermediate the lid or cover and the cans or containers. The partial clinching of lids on cans has a definite and well known meaning in the art. I have found that by tightly clinching the lids onto the cans, baking the contents within the can and immediately completely sealing the cans after baking that I can acquire a vacuum of from 26½ inches to 29½ inches of Hg in the can. Further I have found that even with such high can vacuum the cans will not buckle or panel.

It is desirable to have a very high can vacuum in the sealed can baked cake or special bakery product since a high vacuum insures that the finished baked product will be more stable due to the minimized oxidation within the can with less opportunity for the rusting thereof.

Referring now to Fig. 1 of the drawing wherein there is shown a conventional can designated in its entirety at 10 comprising a body portion 12 and a lid or cover portion 14. The can lid or cover 14, as shown in Figs. 1 and 3, is partially sealed to the can body portion 12 by tightly clinching the lid or cover 14 to the body portion 12. The double seam 16 formed by the tightly clinching step (note Fig. 3) will measure from .154 inch to .169 inch in thickness and between .090 inch to .120 inch in length. In Fig. 3, the length of the clinched double seam 16 is designated L, and the thickness T. Thus the can lid 14 is partially sealed and tightly clinched to the can body 12 so that a pressure is required to be exerted thereagainst in order to rotate the lid 14 in the direction of the arrow with respect to the can body portion 12.

By tightly clinching the lid 14 on the can body 12 there is provided (note Fig. 3) a minute opening 18 intermediate the peripheral edge 20 of the lid 14 and the top peripheral edge 22 of the can body 12. The opening 18 is of particular configuration and provides for an obstructed opening which prevents air, gas or the like from entering the can, and further allows for the release of gases and a certain amount of vapor from the can during the baking of the contents therein. It should be stated that Fig. 3 is enlarged, for the purpose of illustration, and that the obstructed opening 18 shown therein is much smaller in comparison with the thickness of the lid 14 and body 12 than as shown in the drawing. It is necessary to provide a partial seal or an obstructed opening in the cans in order to prevent the creation of high internal pressure and subsequent explosion of the can during the baking of the contents. However such an opening can be too large or unobstructed, as for example a pin hole or a loose clinch, so that after the baking of the contents and before the opening is hermetically sealed, air, gas or the like may enter the closed can through the unobstructed opening, since such an unobstructed opening allows for the entrance of air under normal pressure. Further, such an unobstructed opening will cause a low undesired vacuum when the can is sealed. I have found that a tight clinch within the limits of measurement stated above is critical and essential to acquiring in-can baked canned cake and specialty bakery products which have the characteristics necessary in order for the product to be stable and retain its quality for at least a twelve month period.

The obstructed opening 18 prevents the entrance of air, vapor, or the like into or out of the can unless the air is under a definite pressure. Obviously when the product is being baked the air and/or vapor trapped therein is heated and since the expansion thereof is limited the pressure is increased which affords it the necessary pressure to overcome the obstruction of the opening 18 thereby permitting the trapped air and/or vapor to escape from the can. However, the air which is normally outside of the can is not under any positive pressure and accordingly the obstruction of the opening 18 is such that it will prevent this air from entering the can, thus preventing the entrance of bacteria or the like into the product within the can. In effect the obstructed opening 18 acts as a type of valve which prevents movement of air under normal pressures.

Further, during the baking of the can or container in the oven, to be described in more detail hereinafter, the lid 14 becomes rigidly secured to the can body 12 by reason of the normal expansion of metals when heated so that upon removal of the can from the oven, the lid cannot be rotated with respect to the can body thus closing the opening 18. The lid is completely sealed by a sealing machine, to be described hereinafter, before the obstructed opening 18 has an opportunity to re-open. However, the opening 18 remains open during the baking period for a sufficient time to allow the air, vapor and the like and the gases emitted from the dough to escape. This controlled escape of the gases from the dough gives the finished baked cake and special bakery product the desirable characteristics for consumer appeal. Further, the temporary closing of the obstructed opening 18 assures that no air, vapor, gas or the like may enter the can before the can is permanently sealed.

By providing my tightly clinched lid 14 and can body 12 with an obstructed opening 18 I am able to obtain a certain amount of moisture within the can which will condense on the cooling of the can and be absorbed by the baked cake or special bakery product contained therein, and this absorption coupled with the high can vacuum causes the baked product to retain its oven fresh condition for a long period of time.

The partially sealed tightly clinched can 10 shown in Fig. 1 containing the portions of batter or pieces of dough 24 are then positioned on wire basket trays and placed in an oven and baked until the canned cake or special bakery products are done.

It should be stated that it is desired to have a uniform top and bottom heat in the oven and that each individual can should be spaced from the next adjacent can in order to provide a uniform heat thereto. It should also be stated that it is necessary to coat the can 10 with a special heat grease-resisting enamel which will not cause an off-flavor to the baked cake or special bakery products. Further, it was found that the conventional bright shiny can reflected considerable heat, and in place thereof I have used an olive drab can since the darker surface aids in heat absorption. Through experimentation there has been developed a can having a specially prepared outer gold covering which provides substantially the same amount of heat absorption as the darker oliver drab can and has the added advantage of greater consumer sales appeal.

The in-can baked canned cake and special bakery products are removed from the oven and immediately completely sealed by a sealing machine. The results of actual time motion studies show that when the tray of cans 10 is removed from the oven the first can off the tray is completely sealed within 7 to 12 seconds, and the last can removed from the same tray is completely sealed within 43 to 48 seconds from the time the tray is removed from the oven.

Attention is now directed to Fig. 2 wherein there is shown a can of in-can baked cake or special bakery product 26 after the can has been completely hermetically sealed. It should be noted that the clinched double seam 16 has now been formed into a completely sealed double seam 28 by the sealing machine. As shown in Fig. 4 the thickness of the double seam 28 is designated by T' and the length by L'. It is readily seen that when the can 18 is completely sealed by the double seam 28 the obstructed opening 18 is completely closed.

Thereafter, the can 10 containing the in-can baked canned cake and specialty bakery products is placed on racks and cooled either by a blast of cool air or by a water spray, so that the canned baked product will have a specific temperature of between 80° to 90° F. in the can within a period of time less than 60 minutes.

In both the in-can baked cake product and the in-can baked canned specialty bakery product, the preparation of batters and doughs only sufficient amounts of ingredients are added so that the finished in-can baked cake or specialty bakery product has not more than 34% moisture and a pH value of 4.6 to 5.0.

The following examples serve to illustrate but are not intended to limit the present invention. In each of the following examples the portions of the various mixes are measured for placement in a #2½ or 401 x 411 can which measures 4 3/16 inches in diameter and 4 11/16 inches in height, and the scaling of portions which are measured by weight are adapted to be placed in this type of can and baked therein in an oven. In effect the #2½ can becomes the baking pan for the following examples:

*Almond filled coffee cake*

A dough is prepared from 135 lbs. of flour, 3½ lbs. of high acid milk powder, 21 lbs. shortening, 42 lbs. of corn sugar, 14 lbs. of whole eggs, 14 oz. of vanilla, 3½ oz. of lemon flavoring, 45 lbs. of water, 8 oz. of 85 proof lactic acid, 8 lbs. of yeast, 1½ lbs. of salt, 15 lbs. of pecans. These ingredients are mixed for approximately 15 minutes and scaled into pieces and rolled into long sheets and a filling added. The filling comprises 5 lbs. of almond paste, 1½ lbs. honey, 24 lbs. brown sugar, 2 lbs. of cinnamon, 11 lbs. flour, 9 lbs. of shortening, 1¼ lbs. of water, 5 oz. of vanilla, 4 oz. of almond flavor. lbs. of salt, 9 lbs. of whole eggs, 16 lbs. cake crumbs, 13 The long sheets of dough and filling are then rolled into a spiral and scaled into 15½ oz. pieces, and placed in a #2½ can, left to rise from 15 to 20 minutes. A lid is then tightly clinched, as above stated, on the can and the can is placed in an oven and baked at a temperature of approximately 365° F. for approximately 1 hr. The cans are then removed and immediately sealed and cooled in accordance with the procedure as stated above. The resulting almond filled coffee cake produced in accordance with this specific method will have a moisture content of not more than 34% and a pH value of 4.6 to 4.8.

*Seeded rye bread*

A dough comprising 92 lbs. of white rye flour, 64 lbs. of white clear flour, 83 lbs. of water, 6 lbs. of yeast, 3 lbs. of high acid milk powder, 6 lbs. corn sugar, 8 lbs. of shortening, 1 lb. 85 proof lactic acid, 1½ lbs. of salt, 12 oz. of ground caraway seed, and 4 lbs. of caraway seed are mixed for 3 to 5 minutes in a high speed mixing machine. It is then scaled or weighed into pieces as required, and by way of example for a #2½ can the pieces will weigh 12½ oz. The dough is allowed to rise in the can for approximately 10 to 15 minutes, and then a lid is tightly clinched, as stated above, to the can. A single can from each batch is left open in order to find out the approximate height of the loaf before the can is placed in the oven. When the loaf has reached the proper height the cans are placed in the oven and are baked at 425° F. for approximately 1 hr. After baking the cans are immediately sealed and cooled in accordance with the above stated process until the temperature of the in-can baked loaf of bread is approximately 90° F. The resulting seeded rye bread produced in accordance with the above procedure will have a moisture content of not more than 34% and a pH value of 4.6 to 4.8.

*Pumpernickel bread*

A dough is prepared from 76 lbs. of white rye flour, 48 lbs. of clear white flour, 32 lbs. of pumpernickel flour, 1 lb. 4 oz. of 85 proof lactic acid, 4 lbs. of yeast, 3 lbs. of high acid milk powder, 6 lbs. of shortening, 6 lbs. of molasses, 4 lbs. of corn sugar, 1½ lbs. of salt, 12 oz. ground caraway seed and is mixed for 3 to 5 minutes in a high speed mixing machine. The same procedure for baking rye seeded bread, as stated above, is followed for the in-can baking of pumpernickel bread. The resulting pumpernickel bread product as produced in accordance with this specific method will have a moisture content of not more than 34% and a pH value of 4.6 to 4.8.

*100% whole wheat bread*

A dough is prepared with 64 lbs. of whole wheat flour, 60 lbs. of wheat lax flour, 3 lbs. 12 oz. of corn sugar, 3 lbs. 12 oz. of molasses, 3 lbs. 12 oz. of honey, 7½ lbs. of shortening, 64 lbs. of water, 1½ lbs. of salt, 1 lb. 14 oz. of high acid milk powder, 4 lbs. of yeast, 1¼ lbs. of 85 proof lactic acid which is mixed for 3 to 5 minutes in a high speed mixing machine. The further procedure in the preparation of in-can baked 100% whole wheat bread is the same as that stated above in the process for the preparation of in-can baked rye seeded bread and pumpernickel bread. The resulting 100% wholewheat bread product as produced in accordance with this specific method will have a moisture content of not more than 34% and a pH value of 4.6 to 4.8.

*Sugar-free, salt-free white bread*

A dough is prepared from 75 lbs. of white flour, 6 lbs. of shortening, 1 lb. 4 oz. of high acid milk powder, 44 lbs. of water, 3 lbs. of yeast, 6 oz. of 85 proof lactic acid which is mixed and promptly divided into 14½ oz. pieces and dipped in vegetable shortening to prevent adherence of the dough to the cans. The 14½ oz. pieces are loaded into a #2½ can. A lid is tightly clinched on each can in accordance with the above stated procedure to the loaded cans and the dough is allowed to rise for approximately 15 minutes. The partially sealed cans are then placed in an oven and baked at 425° F. for approximately 1 hr. and after the bread is baked the cans are removed from the oven and immediately completely sealed, and the canned baked bread product cooled in accordance with the procedure stated above. The resulting sugar-free, salt-free white bread product as produced in accordance with this specific method will have a moisture content of not more than 34% and a pH value of 4.6 to 4.8.

The in-can baked cake and the in-can baked specialty bakery products produced in accordance with my novel process outlined above and respectively using the specific formulas stated above provides for a final canned in-can baked cake or in-can baked specialty bakery product having the properties required which satisfy the standards of the baking industry. It has been desired and there has long been a need for such in-can baked canned cake and in-can baked canned specialty bakery products.

I claim:

1. The process of preparing an in-can baked canned rye seeded bread comprising preparing a dough mix in substantially the proportions of 92 lbs. white rye flour, 64 lbs. white clear flour, 83 lbs. water, 6 lbs. yeast, 6 lbs. corn sugar, 8 lbs. shortening, 3 lbs. high acid milk powder, 1 lb. 85 proof lactic acid, 1½ lbs. salt, 12 ozs. ground caraway seed, 4 lbs. caraway seed, loading a container with said dough, allowing said dough to rise in said container for approximately 10 to 15 minutes, partially sealing said loaded container by partially clinching a cover thereto, baking said dough in said partially sealed container, completely sealing said container immediately after the baking thereof and thereafter quickly cooling said sealed container.

2. A rye seeded bread, prepared and baked in a can in accordance with the process of claim 1 and hermetically sealed therein under a vacuum of at least 26½ in. of Hg, said rye seeded bread having a moisture content of less than 34% by weight of the bread and a pH value of 4.6 to 4.8.

References Cited in the file of this patent

UNITED STATES PATENTS

| | | |
|---|---|---|
| 1,680,898 | Matti | Aug. 14, 1928 |
| 2,039,374 | Young | May 5, 1936 |
| 2,271,921 | Luker | Feb. 3, 1942 |

OTHER REFERENCES

Modern Packaging, October 1948, page 206.

Military Specification, Bread Canned, MIL-B-1070A, Dec. 7, 1950, pp. 1 to 4.

Military Specification, Pound Cake, Canned, MIL-P-3234A, Sept. 22, 1952, pp. 1 to 4.